United States Patent
Kumar et al.

(10) Patent No.: US 11,639,184 B2
(45) Date of Patent: May 2, 2023

(54) METHOD AND SYSTEM FOR DIAGNOSING AUTONOMOUS VEHICLES

(71) Applicant: Wipro Limited, Bangalore (IN)

(72) Inventors: Balaji Sunil Kumar, Bengaluru (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 333 days.

(21) Appl. No.: 16/832,005

(22) Filed: Mar. 27, 2020

(65) Prior Publication Data

US 2021/0253126 A1 Aug. 19, 2021

(30) Foreign Application Priority Data

Feb. 13, 2020 (IN) .............................. 202041006365

(51) Int. Cl.
*B60W 60/00* (2020.01)
*G06N 20/00* (2019.01)
*G01C 21/34* (2006.01)

(52) U.S. Cl.
CPC .... *B60W 60/0011* (2020.02); *B60W 60/0015* (2020.02); *B60W 60/0025* (2020.02); *G01C 21/3453* (2013.01); *G06N 20/00* (2019.01)

(58) Field of Classification Search
CPC ......... B60W 60/0011; B60W 60/0015; B60W 60/0025; B60W 50/0205; B60W 50/029; B60W 50/14; G01C 21/3453; G01C 21/28; G01C 21/3697; G01C 25/00; G06N 20/00
See application file for complete search history.

(56) References Cited

U.S. PATENT DOCUMENTS

| | | | |
|---|---|---|---|
| 10,395,444 B1* | 8/2019 | Edren | G07C 5/0808 |
| 2018/0050704 A1 | 2/2018 | Tascione et al. | |
| 2019/0212749 A1* | 7/2019 | Chen | B62D 15/0255 |
| 2020/0070847 A1* | 3/2020 | Horiguchi | B60W 50/04 |
| 2020/0331484 A1* | 10/2020 | Rodriguez Bravo | G01D 18/00 |
| 2021/0049377 A1* | 2/2021 | Hu | B60W 50/029 |
| 2021/0053580 A1* | 2/2021 | Horiguchi | G06V 20/56 |
| 2021/0380127 A1* | 12/2021 | Woo | B60W 60/0015 |
| 2021/0403037 A1* | 12/2021 | Horigome | B60W 60/0018 |
| 2022/0032955 A1* | 2/2022 | Xiang | G06V 20/56 |
| 2022/0108604 A1* | 4/2022 | Duggal | G07C 5/0808 |

* cited by examiner

*Primary Examiner* — Ryan Rink
(74) *Attorney, Agent, or Firm* — Finnegan, Henderson, Farabow, Garrett & Dunner, LLP

(57) ABSTRACT

A method and system for diagnosing autonomous vehicles is disclosed. The method includes identifying anomaly in a set of navigation parameters from a plurality of navigation parameters associated with the autonomous vehicle, such that each of the set of navigation parameters is above an associated risk threshold. The method further includes validating anomaly identified for each of the set of navigation parameters. The method includes generating a set of quality parameters for the set of navigation parameters in response to validating anomaly in the set of navigation parameters. The method further includes generating values of at least one motion parameter associated with the autonomous vehicle based on values of each of the set of quality parameters fed into a trained Artificial Intelligence (AI) model. The method includes controlling the at least one motion parameter based on the generated values.

13 Claims, 11 Drawing Sheets

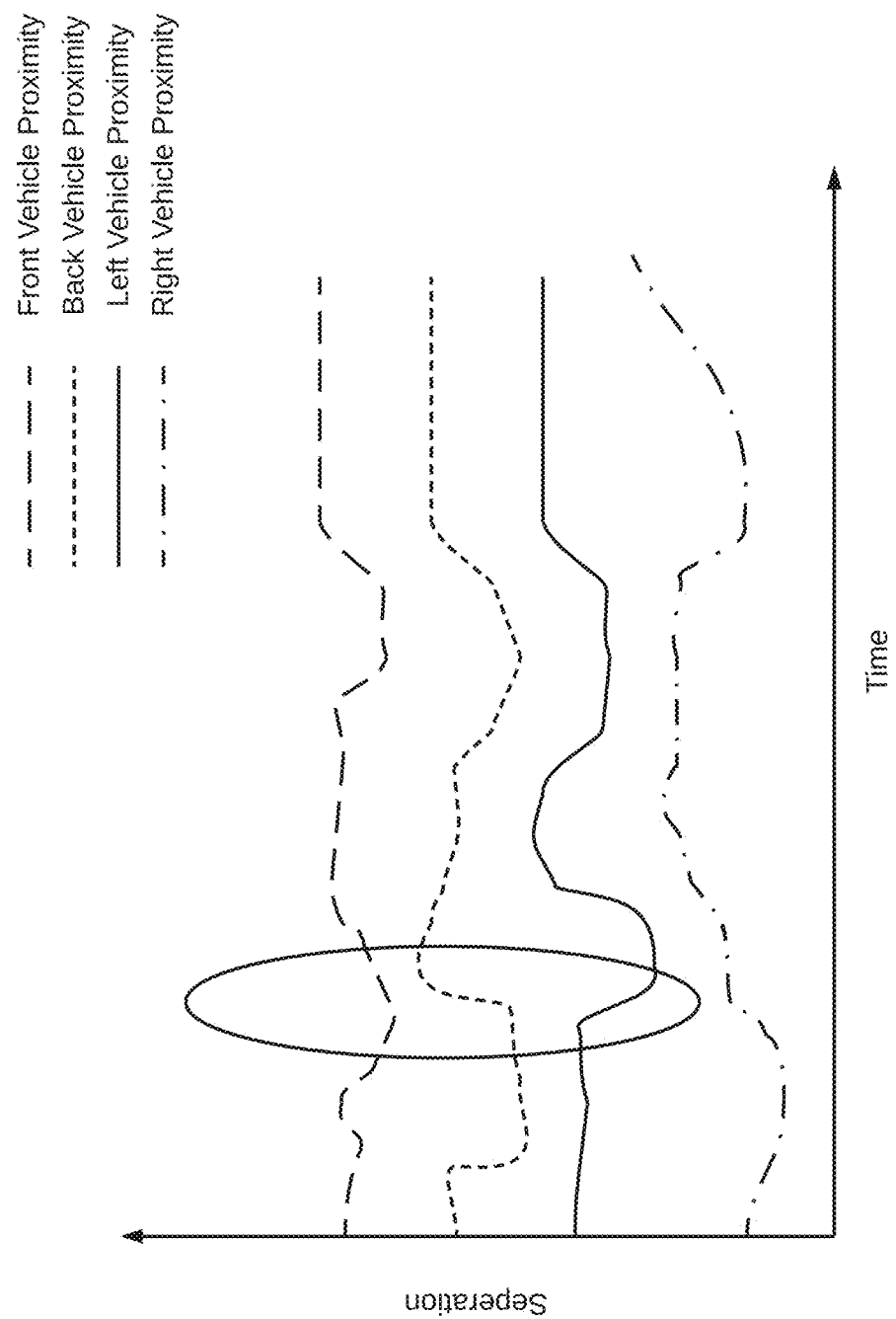

METHOD AND SYSTEM FOR DIAGNOSING AUTONOMOUS VEHICLES

TECHNICAL FIELD

This disclosure relates generally to autonomous vehicles, and more particularly to method and system for diagnosing autonomous vehicles.

BACKGROUND

Autonomous vehicles are one of the rapidly evolving automotive vehicle technologies. Autonomous vehicles include multiple sensors and an on-board sensor data processing unit, which are responsible for enabling its autonomous operation. These sensors equipped in autonomous vehicles are responsible for sensing vehicle parameters and environment in order to ensure or enable secure navigation of autonomous vehicles without requiring human input. Thus, any fault or failure of these sensors or any part of the autonomous vehicles may lead to an unexpected eventuality.

Some conventional technologies may be capable of detecting such faults and failures related to sensors within the autonomous vehicle. However, these conventional technologies cannot monitor vehicle behavior, cross verify if such vehicle behavior is related to vehicle health, and then determine various compensating motion parameter values using machine learning models.

SUMMARY

In an embodiment, a method for diagnosing autonomous vehicles on a current navigation path is disclosed. In one embodiment, the method may include identifying, by a diagnosis device, anomaly in a set of navigation parameters from a plurality of navigation parameters associated with the autonomous vehicle. Each of the set of navigation parameters is above an associated risk threshold. The method may further include validating, by the diagnosis device, anomaly identified for each of the set of navigation parameters. The method may include generating, by the diagnosis device, a set of quality parameters for the set of navigation parameters in response to validating anomaly in the set of navigation parameters. The set of quality parameters are generated from at least one of the plurality of navigation parameters. The method may further include generating, by the diagnosis device, values of at least one motion parameter associated with the autonomous vehicle based on values of each of the set of quality parameters fed into a trained Artificial Intelligence (AI) model. The method may include controlling, by the diagnosis device, the at least one motion parameter based on the generated values for the at least one motion parameter.

In another embodiment, a system for diagnosing autonomous vehicles on a current navigation path is disclosed. The system includes a processor and a memory communicatively coupled to the processor, wherein the memory stores processor instructions, which, on execution, causes the processor to identify anomaly in a set of navigation parameters from a plurality of navigation parameters associated with the autonomous vehicle, wherein each of the set of navigation parameters is above an associated risk threshold. The processor instructions further causes the processor to validate anomaly identified for each of the set of navigation parameters. The processor instructions causes the processor to generate a set of quality parameters for the set of navigation parameters in response to validating anomaly in the set of navigation parameters, wherein the set of quality parameters are generated from at least one of the plurality of navigation parameters. The processor instructions further causes the processor to generate values of at least one motion parameter associated with the autonomous vehicle based on values of each of the set of quality parameters fed into a trained AI model. The processor instructions causes the processor to control the at least one motion parameter based on the generated values for the at least one motion parameter.

In yet another embodiment, a non-transitory computer-readable storage medium is disclosed. The non-transitory computer-readable storage medium has instructions stored thereon, a set of computer-executable instructions causing a computer comprising one or more processors to perform steps comprising identifying anomaly in a set of navigation parameters from a plurality of navigation parameters associated with the autonomous vehicle, wherein each of the set of navigation parameters is above an associated risk threshold; validating anomaly identified for each of the set of navigation parameters; generating a set of quality parameters for the set of navigation parameters in response to validating anomaly in the set of navigation parameters, wherein the set of quality parameters are generated from at least one of the plurality of navigation parameters; generating values of at least one motion parameter associated with the autonomous vehicle based on values of each of the set of quality parameters fed into a trained AI model; and controlling the at least one motion parameter based on the generated values for the at least one motion parameter.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 7A-7D illustrate graphs that are used for identification of a set of navigation parameters associated with an autonomous vehicle, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
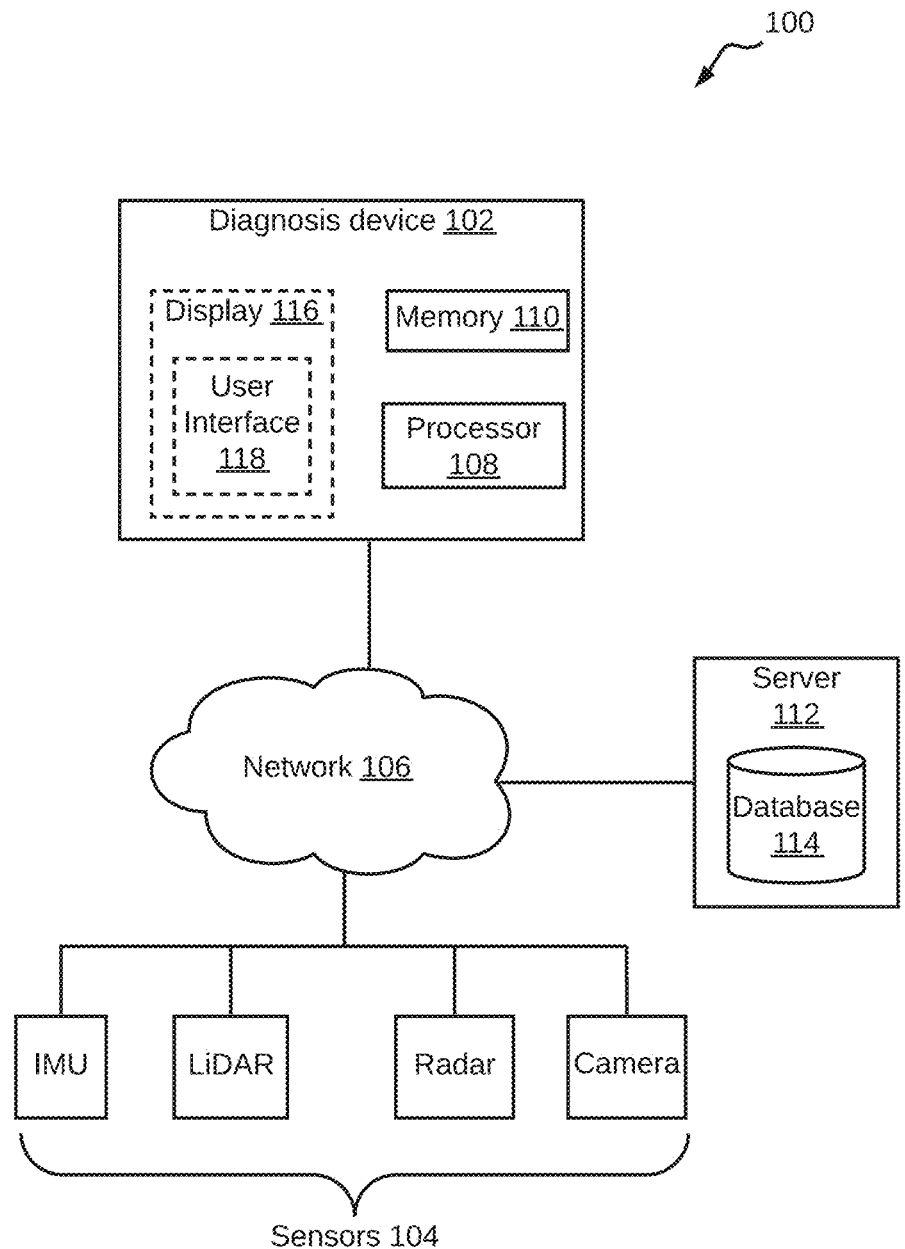
FIG. 1 is a block diagram illustrating a system for diagnosing autonomous vehicles, in accordance with an embodiment.

In one embodiment, a system 100 for diagnosing autonomous vehicles is illustrated in FIG. 1. It will be apparent to a person skilled in the art that the system 100 may be included within an autonomous vehicle (not shown in FIG. 1). The system 100 may include a diagnosis device 102 that has the processing capabilities for diagnosing an autonomous vehicle in order to identify an anomaly in a set of navigation parameters for the autonomous vehicle and subsequently generate control parameters or motion parameters associated with the autonomous vehicle to resolve the anomaly. Examples of the diagnosis device 102 may include, but are not limited to a server, a desktop, a laptop, a notebook, a netbook, a tablet, a smartphone, or a mobile phone.

The set of navigation parameters may include, but is not limited to, a rate of change in steering speed, acceleration and breaking time of the autonomous vehicle, proximity of autonomous vehicle with nearby vehicles, and attributes associated with a tracked path. In an embodiment, the anomaly identified in the set of navigation parameters may correspond to any deviation of each of the set of navigation parameters from an associated risk threshold. In other words, the anomaly may indicate deviation of the autonomous vehicle from what is standard, normal, or expected. By way of an example, an anomaly may include, but is not limited to an abrupt change in the steering angle or linear acceleration, continuous close proximity of a rear vehicle, frequent close proximity with objects, and a very high rate of change of orientation of the autonomous vehicle.

The diagnosis device 102 may receive a plurality of navigation parameters from a plurality of sensors 104 placed at various locations within the autonomous vehicle. By way of an example, the plurality of sensors 104 may include, but are not limited to, an Inertial Measurement Unit (IMU), a vision sensor, an ultrasonic sensor, a camera sensor, a Light Detection and Ranging (LiDAR) sensor, or a Radar. The plurality of sensors 104 may be communicatively coupled to the diagnosis device 102, via a network 106. The network 106 may be a wired or a wireless network and the examples may include, but are not limited to the Internet, Wireless Local Area Network (WLAN), Wireless Fidelity (Wi-Fi), Long Term Evolution (LTE), Worldwide Interoperability for Microwave Access (WiMAX), Fifth Generation (5G) network, and General Packet Radio Service (CPRS).

As will be described in greater detail in conjunction with FIG. 2 to FIG. 6, in order to diagnose the autonomous vehicle, the diagnosis device 102 may include a processor 108, which may be communicatively coupled to a memory 110. The memory 110 may store process instructions, which when executed by the processor 108 may cause the processor 108 to diagnose the autonomous vehicle. This is further explained in detail in conjunction with FIG. 2. The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

Also, the diagnosis device 102 may extract risk thresholds for various navigation parameters from a server 112, via the network 106, in order to identify anomalies in the set of navigation parameters. It will be apparent to a person skilled in the art that the server 112 may be remotely located, such that, the server 112 may be accessed my multiple autonomous vehicles at any given time. In one implementation, the server 112 may be located within the autonomous vehicle. Once the diagnosis device 102 has received the plurality of navigation parameters and the associated risk thresholds, the diagnosis device 102 may identify the set of navigation parameters. This is further explained in detail in conjunction with FIG. 2 and FIG. 3. The server 112 may include a database 114 that may further include a mapping of each navigation parameter to an associated risk threshold. The database 114 may be updated periodically with new navigation parameters and revised risk thresholds, if any.

The diagnosis device 102 may further include a display 116 that may further include a user interface 118. A user or an administrator may interact with the diagnosis device 102 and vice versa through the display 116. The display 116 may be used to display a result of diagnosis of the autonomous vehicle performed by the diagnosis device 102. The user interface 118 may be used by the user to provide inputs to the diagnosis device 102.

Figure 2:
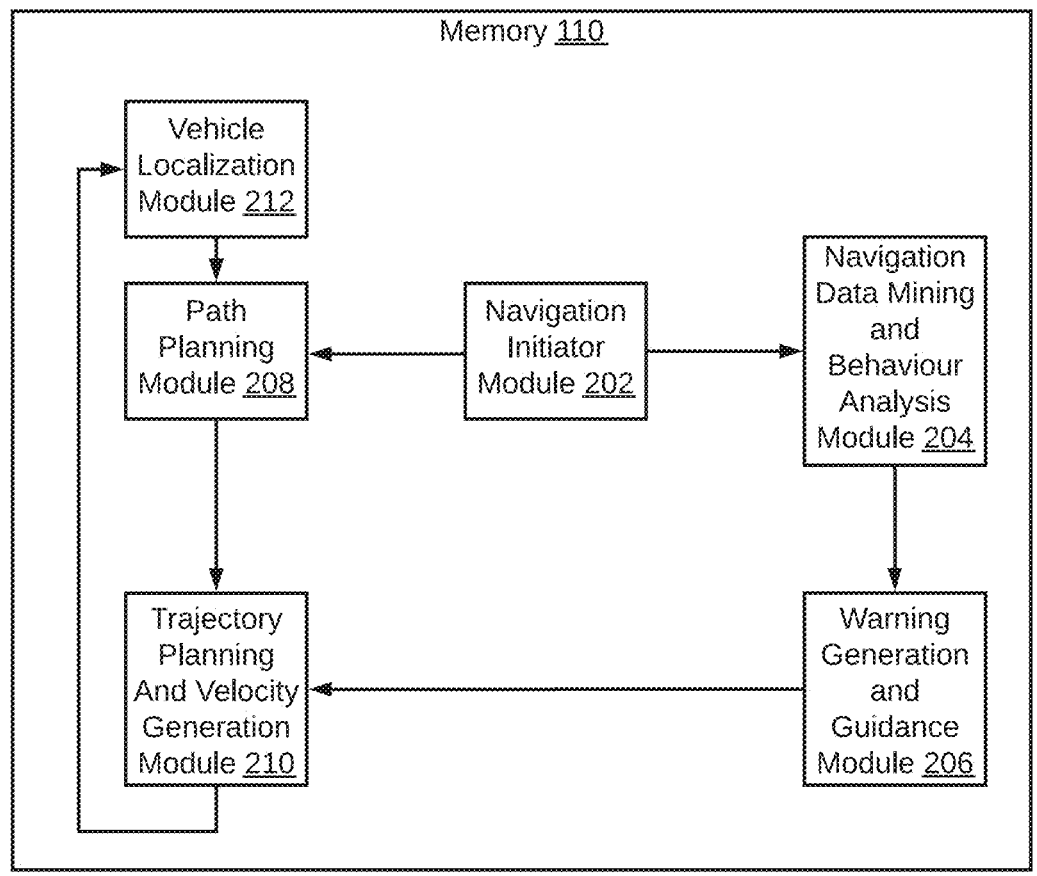
FIG. 2 illustrates a functional block diagram of various modules within a memory of a diagnosis device configured to diagnose autonomous vehicles, in accordance with an embodiment.

Referring now to FIG. 2, a functional block diagram of various modules within the memory 110 of the diagnosis device 102 configured to diagnose autonomous vehicles is illustrated, in accordance with an embodiment. As explained in conjunction with FIG. 1, the diagnosis device 102 may diagnose an autonomous vehicle in order to identify an anomaly in a set of navigation parameters for the autonomous vehicle and subsequently generate control parameters or motion parameters associated with the autonomous vehicle to resolve the identified anomaly. The memory 110 may include a navigation initiator module 202, a navigation data mining and behavior analysis module 204, a warning generation and guidance module 206, a path planning module 208, a trajectory planning and velocity generation module 210, and a vehicle localization module 212.

In an embodiment, the navigation initiator module 202 may act as a user interface for displaying a navigation map to a user of the autonomous vehicle. As a result, the user may touch any point on the navigation map displayed via the user interface to select a destination point and initiate the navigation process for the autonomous vehicle from its current location. The navigation process may include path planning and velocity generation to autonomously drive the autonomous vehicle to the destination point. By way of an example, the navigation initiator module 202 may provide a part of the global path to the autonomous vehicle, in order to initiate motion of the autonomous vehicle from the current location. The part of the global path may include a navigation path of 10 to 20 meters ahead of the autonomous vehicle.

Once the navigation process is initiated, the navigation data mining and behavior analysis module 204 may analyze navigation behavior of the autonomous vehicle. The navigation behavior of the autonomous vehicle may be determined based on navigation behavior data collected over a period of time. The navigation behavior data may correspond to a plurality of navigation parameters. By way of an example, the plurality of navigation parameters may include, but are not limited to a rate of change in steering speed, an acceleration and breaking time of the autonomous vehicle, a proximity of autonomous vehicle with nearby vehicles, and attributes associated with a tracked path.

In an embodiment, the plurality of navigation parameters may be analyzed to determine multiple distinct behavioral patterns of the autonomous vehicle. These behavioral patterns may include, but are not limited, twist handling of vehicle a proximity to other moving and nonmoving vehicles, a jerk felt inside the autonomous vehicle, a sudden variation in the speed of the autonomous vehicle, and smoothness of the path followed by the autonomous vehicle. In an embodiment, the navigation data mining and behavior analysis module 204 may compare each of the plurality of navigation parameters with associated risk thresholds. Based on the comparison, the navigation data mining and behavior analysis module 204 may identify anomaly in a set of navigation parameters from the plurality of navigation parameters, such that, each of the set of navigation parameters is above an associated risk threshold. The identified anomalies are then represented as the behavioral patterns described above.

Figure 7A:
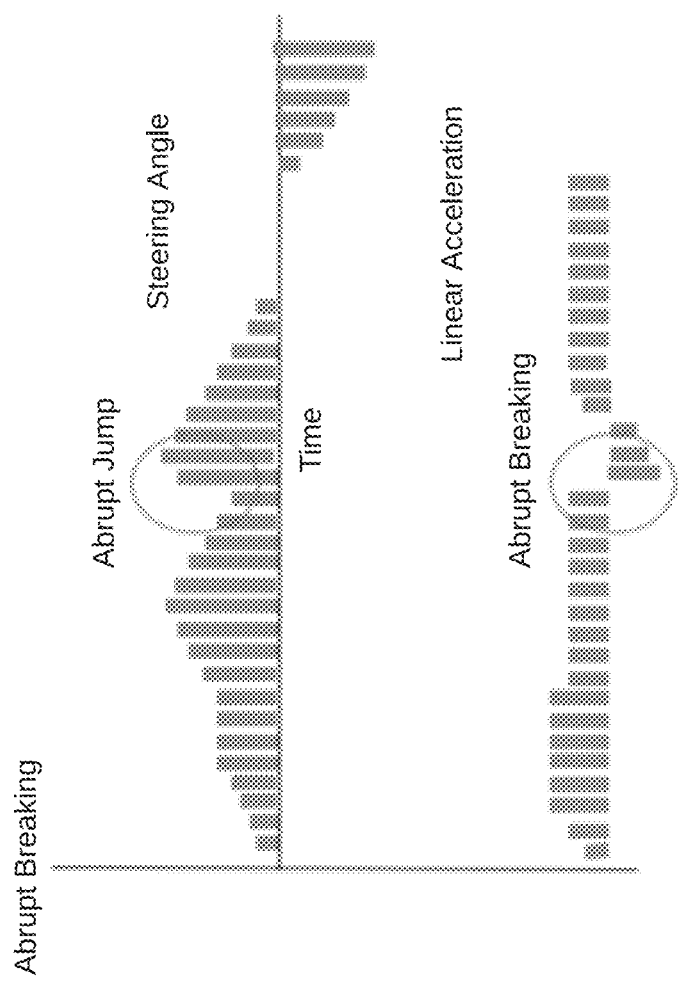
Figure 7B:
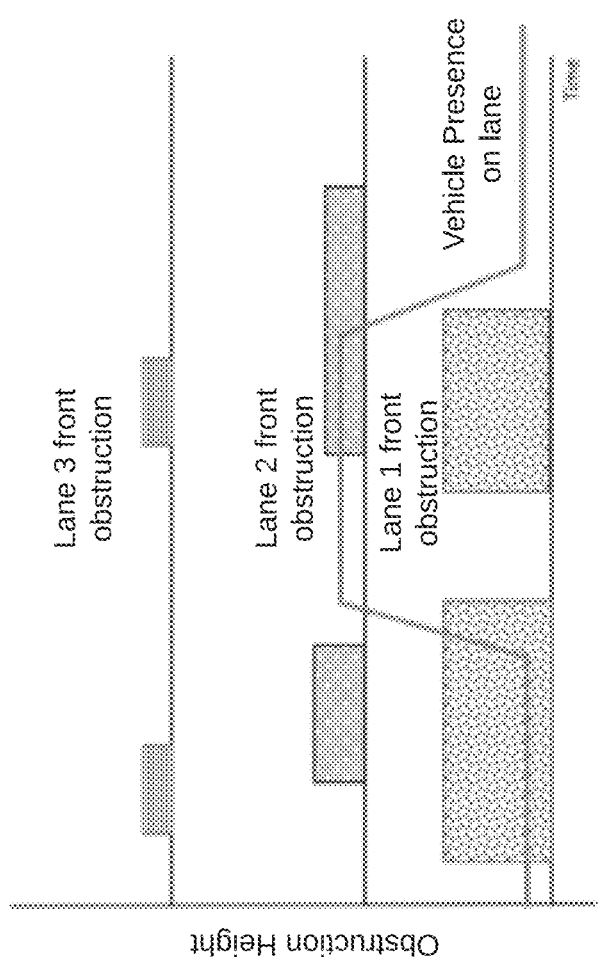
Figure 7D:
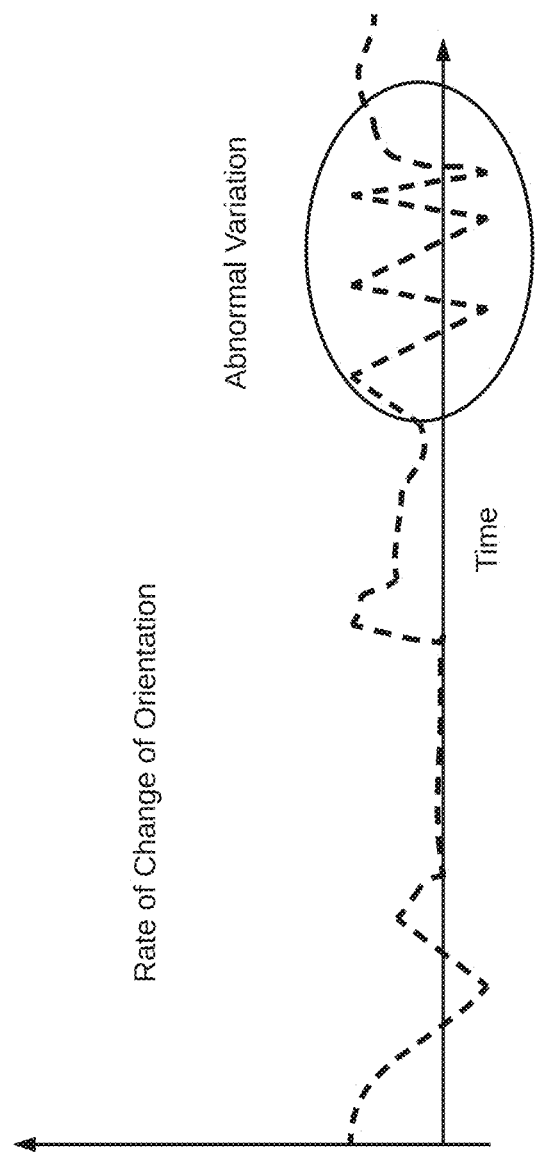

By way of an example, for the navigation parameter of rate of change in steering speed, the rate of change of steering angle at a critical point of safe maintenance distance (even close proximity to objects) may indicate the autonomous vehicle's planned and sudden maneuvering. By way of another example, for the navigation parameter of an acceleration and breaking time of the autonomous vehicle, an acceleration and breaking graph may be observed to determine an unprovoked rash driving scenario. An exemplary graph depicting change in steering angle and change in linear acceleration of the autonomous vehicle is illustrated in the exemplary embodiment of FIG. 7A. This may be cross verified based on proximity data collected from other sensors. By way of yet another example, for the navigation parameter of proximity of autonomous vehicle with nearby vehicles, a comprehensive object proximity graph may be analyzed to determine if the autonomous vehicle is within a threshold range related to presence of nearby objects. The object proximity graph may be determined using data collected by vision sensors and other sensors during vehicle journey. An exemplary graph depicting lane occupancy and vehicle proximity for the autonomous vehicle is illustrated in the exemplary embodiments of FIGS. 7B and FIG. 7C. At a given instance, product of all distance determine criticality of vehicle proximity. Lesser value of such distance may indicate that autonomous vehicle has reached more critical position. By way of another example, for the navigation parameter of attributes associated with a tracked path, smoothness of the tracked path in terms of left and right rotation of the autonomous vehicle may be observed. An exemplary graph depicting smoothness of tracked path for the autonomous vehicle is illustrated in the exemplary embodiment of FIG. 7D.

Thereafter, the warning generation and guidance module 206 may further analyze the set of navigation parameters to determine if the identified anomalies in the set of navigation parameters is persistent or is just a temporal occurrence. In an embodiment, the identified anomaly in a navigation parameter is determined to be persistent or temporal based on the number of repetition of the identified anomaly. Persistence of an anomaly in a navigation parameter is established, when the number of instances where the navigation parameter crosses an associated risk threshold is above an associated reoccurrence threshold.

Once persistence or permanence of anomaly identified for the set of navigation parameters is established, the warning generation and guidance module 206 may validate the anomaly identified for each of the set of navigation parameters by evaluating an associated data. By way of an example, the data may include, but is not limited to validation of the IMU sensor data with a camera sensor data, validation of a camera sensor data with a vision sensor data, and validation of vision sensor data with the IMU sensor data and vice versa. The warning generation and guidance module 206 may also generate a warning in response to validation of identified anomaly for each of the set of navigation parameters. The warning generation and guidance module 206 may then render the generated warning to a user of the autonomous vehicle, via the navigation initiator module 202, for example.

After validation of the identified anomaly in the set of navigation parameters, the warning generation and guidance module 206 generates a set of quality parameters based on one or more of the plurality of navigation parameters. By way of an example, the set of quality parameters may include, but is not limited to a wheel and steering joint quality, a proximity encounter direction, level of proximity encounter, a quality of perception, and a load current slope.

The warning generation and guidance module 206 may feed the set of quality parameters into a trained Artificial Intelligence (AI) model. The training of the AI model is explained in detail in conjunction with FIG. 6. The trained AI model may then generate values of one or more motion parameters associated with the autonomous vehicle based on values of each of the set of quality parameters. The values of one or more motion parameters may correspond to a response generated for each of the set of quality parameters. Examples of one or more motion parameters may include, but are not limited to adjusting speed for motion plan, adjusting steepness on turn, a lane shift priority, a perception fault and safe parking, and an adjustment code for vision sensor priority.

As an example of identifying and subsequently validation anomaly in a navigation parameter, generating one or more quality parameters, and finally generating values for one or more motion parameters by the trained AI model based on the values of one or more quality parameters, the diagnosis device 102 may identify an abrupt steering angle change or linear acceleration change measured via an IMU sensor. In other words, the diagnosis device 102 may identify an anomaly in steering angle and linear acceleration. The diagnosis device 102 may cross validate the anomaly thus identified using map data for path nature, a camera sensor data for road quality (for example, presence of potholes or rough surface), and nearby vehicle motion record using a Kalman filter. Based on the cross validation, the diagnosis device 102 may determine that the autonomous vehicle itself is the cause for abrupt steering or linear acceleration. Thereafter, the diagnosis device 102 may determine the quality parameters, i.e., wheel joint quality and steering joint quality, for the autonomous vehicle, based on equations 1 and 2 given below:

$$SJq=(Ms*Ns)/T \quad (1)$$

$$WJq=(Mw*Nw)/T \quad (2)$$

Where,
SJq=Steering joint quality,
WJq=Wheel joint quality,
M=Abruption magnitude,
N=Number of gear jumps,
s=steering,
w=wheel, and
T=Pre-determined time period.

The diagnosis device 102 may feed the values of SJq and WJq into the trained AI model, which may generate a trigger for further motion plan of the autonomous vehicle on low speed, as one or more mechanical or electrical parts of the autonomous vehicle may not be able to handle high speed motion plan.

By way of another example, the diagnosis device 102 may identify close proximity of rear vehicle to the autonomous vehicle that may be measured, via an ultrasonic sensor, as an anomaly. In order to validate the anomaly, the diagnosis device 102 may use LIDAR based tracking of vehicle in close proximity of the autonomous vehicle using Kalman filter, in order to determine the reason of close proximity of such vehicles. Based on the validation, the diagnosis device 102 may determine that the autonomous vehicle itself is the reason of close proximity. Thus, the diagnosis device 102 may determine one or more quality parameters, i.e., a proximity encounter direction, i.e., Dp. The value of Dp may be 0 for front, 1 for left, 2 for right, and 3 for back. The diagnosis device 102 may feed value determined for Dp into the trained AI model, which may generate guidance on trajectory planning parameters in order to reduce steepness in lane transition trajectory plan for the autonomous vehicle.

By way of yet another example, the diagnosing device 102 may identify frequent close proximity of objects to the autonomous vehicle, measured via an ultrasonic sensor, as an anomaly. The diagnosis device 102 may then validate the anomaly by analyzing the tachometers reading to check whether the autonomous vehicle is moving at a slow speed on an express lane having a minimum permissible vehicle speed. The diagnosis device 102 may further validate the anomaly by analyzing camera data. For example, the camera data may be analyzed to check for any particular weather condition that may encourage fast driving, and the autonomous vehicle may not be doing so. Based on validation of the anomaly, the diagnosis device 102 may determine that the anomaly is due to a fault in the autonomous vehicle. Thereafter, the diagnosis device 102 may determine one or more quality parameters, i.e., a level of proximity encounter based on equation 3 given below:

$$Pe=\Sigma(Pa/Pt)/N \quad (3)$$

Where,
Pe is the level of proximity encounter,
Pa is actual proximity,
Pt is proximity threshold, and
N is the number of violations in a predetermined time period.

The diagnosis device 102 may feed values of Pe into the trained AI model, which may generate values of control parameters to adapt speed and/or acceleration of the autonomous vehicle in order to adapt to road conditions and any environment scenario. For example, the trained AI mode may provide updated speed related parameters for trajectory planning of the autonomous vehicle. Alternatively, the AI model may trigger a lane change action for the autonomous vehicle, such that, the autonomous vehicle shifts into a slow moving lane.

By way of another example, the diagnosis device 102 may identify a rate of change of orientation of the autonomous vehicle, via the IMU sensor, as an anomaly. The diagnosis device 102 may then validate the anomaly by analyzing camera data to determine if the change in orientation (for example, zigzag movement) was required because of the road conditions. Based on the validation, the diagnosis device 102 may determine that the anomaly is due to a fault in the autonomous vehicle. Thereafter, the diagnosis device 102 may determine one or more quality parameters, i.e., a quality of perception and a load current slope, based on equations (4) and (5) given below:

$$Qp=\Sigma(Tz*Mz)/100 \quad (4)$$

Where,
Qp is the quality of perception,
Tz is the length of zigzag interval, and
Mz is the magnitude covering the left and right swing.

$$LCs=\Sigma(Cd)/N \quad (5)$$

Where,
LCs is the load current slope,
Cd is significant drop in current, while the autonomous vehicle takes a turn, and
N is the number of time this occurred over a predetermined time period.

The diagnosis device 102 may feed values of Qp and LCs into the trained AI model, which may generate a warning (for example, a red alert) when there is perception related issue in the autonomous vehicle. Additionally, for battery and load related problems, the trained AI model may trigger or initiate an emergency battery mode.

Each of the one or more quality parameters may correspond to an error category from a plurality of error categories. The AI model is trained based on the plurality of error categories and the corresponding output values of one or more motion parameters. This is further explained in detail in conjunction with FIG. 6.

Once the values of one or more motion parameters are generated, the warning generation and guidance module 206 may control the one or more motion parameters based on the determined values. In an embodiment, the trajectory planning and velocity generation module 210 may control the one or more motion parameters. The trajectory planning and velocity generation module 210 may also receive inputs from the path planning module 208.

The path planning module 208 may produces a base path that is to be used for navigation of the autonomous vehicle from a current position to the destination point. To this end, the path planning module 208 may include a path planning algorithm, for example, a Dijkstra or A*. The base path may be produced on a 2D occupancy grid map. For motion of the autonomous vehicle, the path planning module 208 may generate a part of the base path that is 5 to 10 meters distance from the current position of the autonomous vehicle. The path planning module 208 may also generate a suitable trajectory plan for this part of the base path, based on current environment data and speed of the autonomous vehicle. The path planning module 208 may share the trajectory plan with the trajectory planning and velocity generation module 210 and the navigation initiation module 202 for velocity generation.

Based on inputs from the warning generation and guidance module 206 and the path planning module 208, the trajectory planning and velocity generation module 210 may generate a realistic velocity for the autonomous vehicle based on a preceding velocity and a projected velocity as per the trajectory plan based on a trajectory-velocity plan. Additionally, the trajectory planning and velocity generation module 210 may generate velocity at a predefined frequency, for example, 100 ms. The velocity may then be applied to wheel base of the autonomous vehicle. The trajectory planning and velocity generation module 210 may additionally analyze a next moment velocity of the autonomous vehicle for calculation of realistic velocity for the autonomous vehicle.

The vehicle localization module 212 may determine a current position of the autonomous vehicle on the navigation map based on inputs received from the path planning module 208, the navigation initiator module 202, and the trajectory planning and velocity generation module 210, Based on the position determined by the vehicle localization module 212, the autonomous vehicle may proceed on a next portion of the trajectory plan with a suitable velocity.

Figure 3:
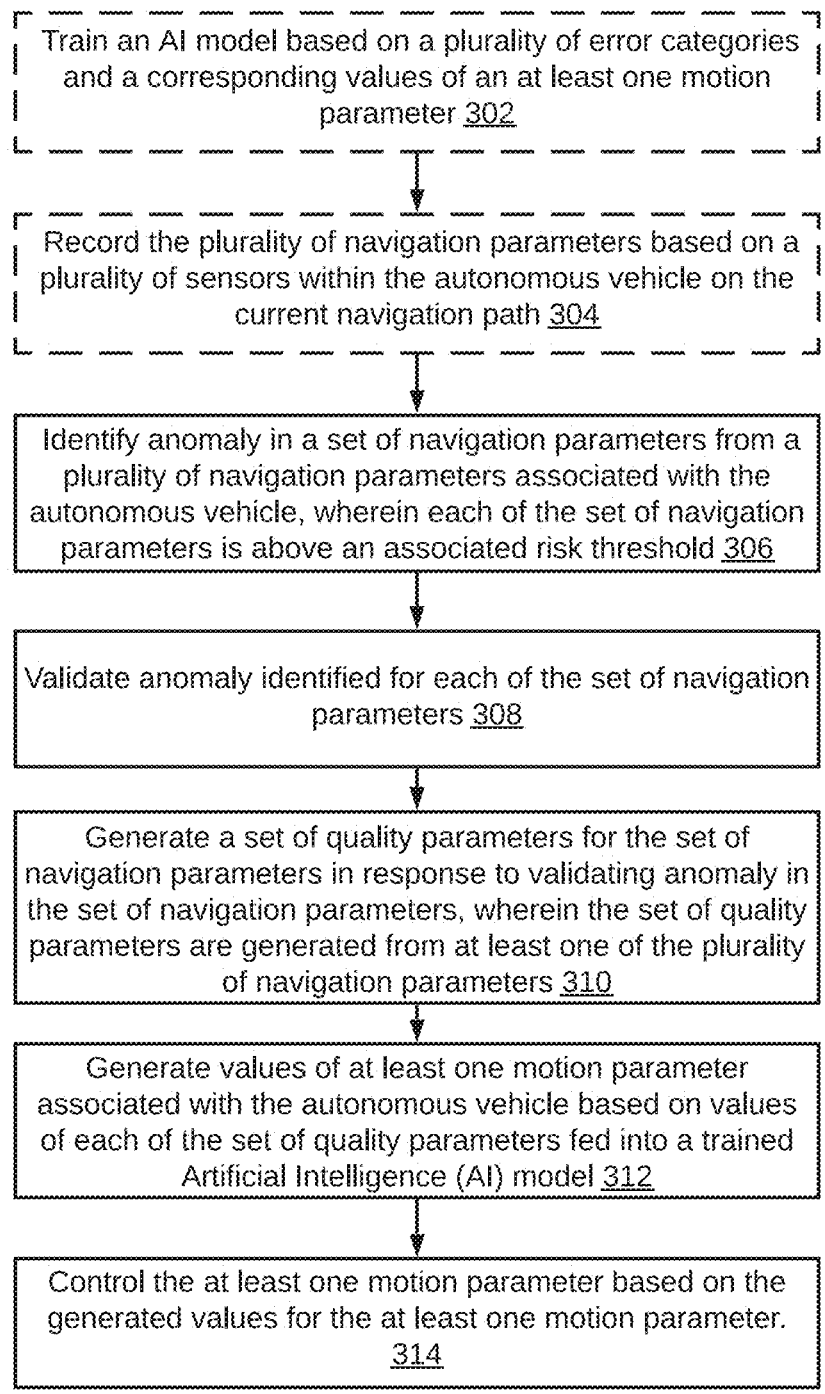
FIG. 3 illustrates a flowchart of a method for diagnosing an autonomous vehicle on a current navigation path, in accordance with an embodiment.

Referring now to FIG. 3, a flowchart of a method for diagnosing an autonomous vehicle on a current navigation path is illustrated, in accordance with an embodiment. At step 302, the diagnosis device 102 trains an AI model based on a plurality of error categories and corresponding values of one or more motion parameters. As already explained in FIG. 2, the plurality of error categories may correspond to a set of quality parameters, Referring back to equations 1 to 5, the error categories, for example, may include, but are not limited to, surrounding's proximity encounter level, i.e., Pe, a proximity encounter direction, i.e., Dp, a vehicle wheel joint mechanical quality, i.e., WJq, a vehicle steering joint mechanical quality, i.e., SJq, a load vs current supply graph linearity, i.e., LCs, and a perception quality measure, i.e., Op. Further, examples of the one or more motion parameters may include, but are not limited to adjusted speed for motion plan of the autonomous vehicle, adjusted steepness on turns, lane shift priority, perception fault and safe parking, and adjustment code for vision sensors priority.

Using the plurality of sensors 104 within the autonomous vehicle, the diagnosing device 102 may record a plurality of navigation parameters on the current navigation path, at step 304, Examples of the plurality of sensors 104 may include, but are not limited to, IMU sensors, LiDAR sensor, Radar, ultrasonic sensor, and a camera sensor. Thereafter, at step 306, the diagnosis device 102 may identify an anomaly in a set of navigation parameters from the plurality of navigation parameters associated with the autonomous vehicle. The plurality of navigation parameters may include, but are not limited to a rate of change in steering speed, an acceleration and breaking time of the autonomous vehicle, a proximity of autonomous vehicle with nearby vehicles, and attributes associated with a tracked path, Each of the plurality of navigation parameters have an associated risk threshold and each of the set of navigation parameters is above its associated risk threshold. A risk threshold, for example, may correspond to a maximum limit that the autonomous vehicle may handle and resist before any technical failure.

In an embodiment, the anomaly identified in the set of navigation parameters may correspond to any deviation of each of the set of navigation parameters from an associated risk threshold. In other words, the anomaly may indicate deviation of the autonomous vehicle from what is standard, normal, or expected. By way of an example, an anomaly may include, but is not limited to an abrupt change in the steering angle or linear acceleration, continuous close proximity of a rear vehicle, frequent close proximity with objects, and a very high rate of change of orientation of the autonomous vehicle.

At step 308, the diagnosis device 102 may validate the anomaly identified for each of the set of navigation parameters, by evaluating an associated data. The data may include, but is not limited to a validation of the IMU sensor data with a camera sensor data, a validation of a camera sensor data with a vision sensor data, and a validation of vision sensor data with the IMU sensor data and vice versa.

Once the anomaly is validated, at step 310, the diagnosis device 102 may generate a set of quality parameters for the set of navigation parameters in response to validating the anomaly identified in the set of navigation parameters. The set of quality parameters may be generated from one or more of the plurality of navigation parameters. The generation of quality parameters has already been explained in detail in conjunction with FIG. 2. Some of the examples of the quality parameters are given by way of equations 1 to 5.

Thereafter, at step 312, the diagnosis device 102 may generate values of one or more motion parameters associated with the autonomous vehicle based on values of each of the set of quality parameters fed into a trained AI model. At step 314, the diagnosis device 102 may control the one or more motion parameters based on values generated for the one or more motion parameters. This has already been explained in detail in conjunction with FIG. 2.

Figure 4:
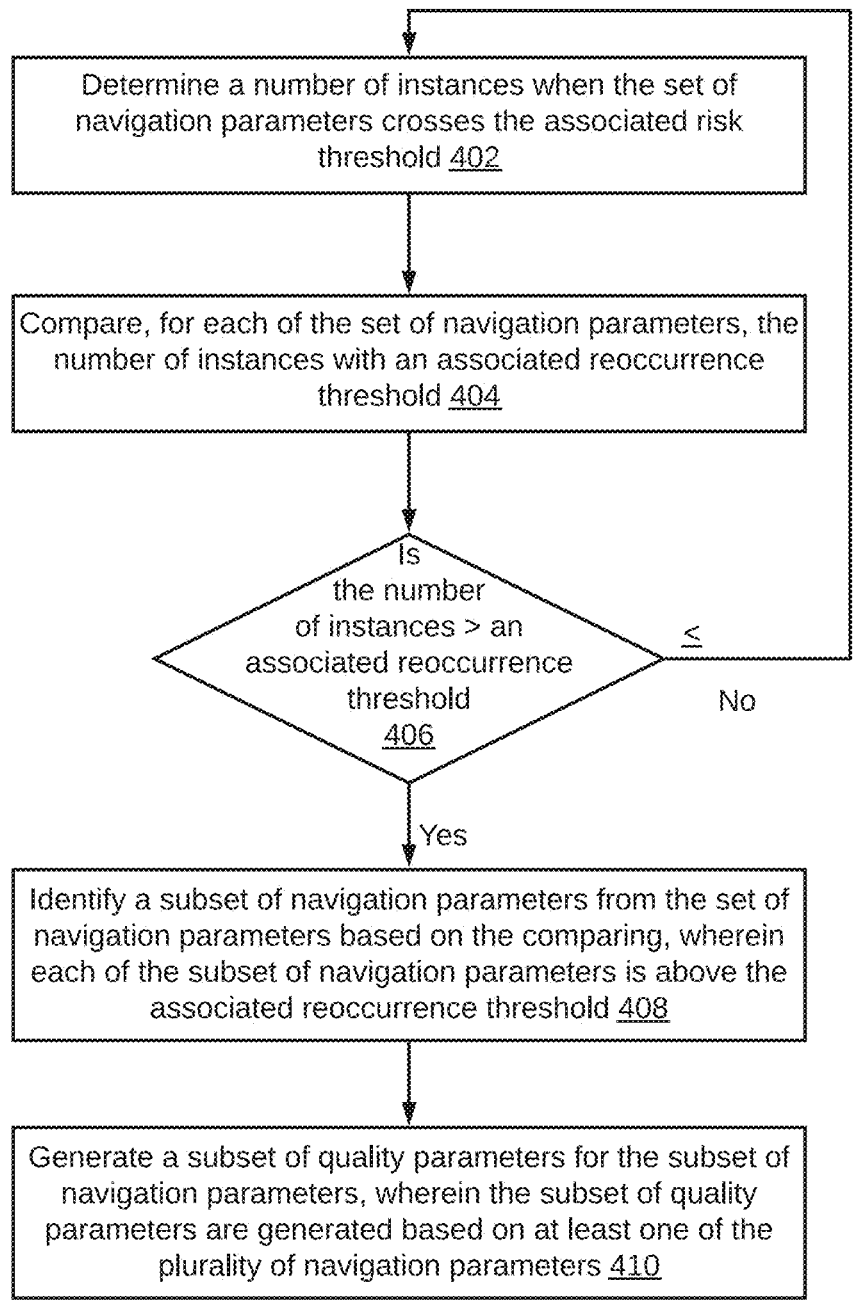
FIG. 4 illustrates a flowchart of a method for determining number of instances when each of a set of navigation parameters crosses an associated risk threshold, in accordance with an embodiment.

Referring now to FIG. 4, a flowchart of a method for determining number of instances when each of a set of navigation parameters crosses the associated risk threshold is illustrated, in accordance with an embodiment. At step 402, a number of instances when each of the set of navigation parameters crosses the associated risk threshold may be determined. Once the number of instances are determined for each of the set of navigation parameters, the number of instances for each of the set of navigation parameters may be compared with an associated reoccurrence threshold, at step 404.

At step 406, for each of the set of navigation parameters, a check may be performed to determine if the number of instances is greater than the associated reoccurrence threshold. If the number of instances for each of the set of navigation parameters is less than the associated reoccurrence threshold, the control moves to step 402. However, if the number of instances is greater than the associated reoccurrence threshold for one or more of the set of navigation parameters, a subset of navigation parameters may be identified, at step 408, from the set of navigation parameters. Thereafter, at step 410, a subset of quality parameters are generated for the subset of navigation parameters based on one or more of the plurality of navigation parameter.

By way of this embodiment, an additional check may be performed before validation of anomaly identified in the set of navigation parameters. Thus, in this embodiment, anomaly is identified for the subset of navigation parameters, which is then subsequently validated. Also, values of the one or more motion parameters is generated based on values of the subset of quality parameters fed into the AI model.

Figure 5:
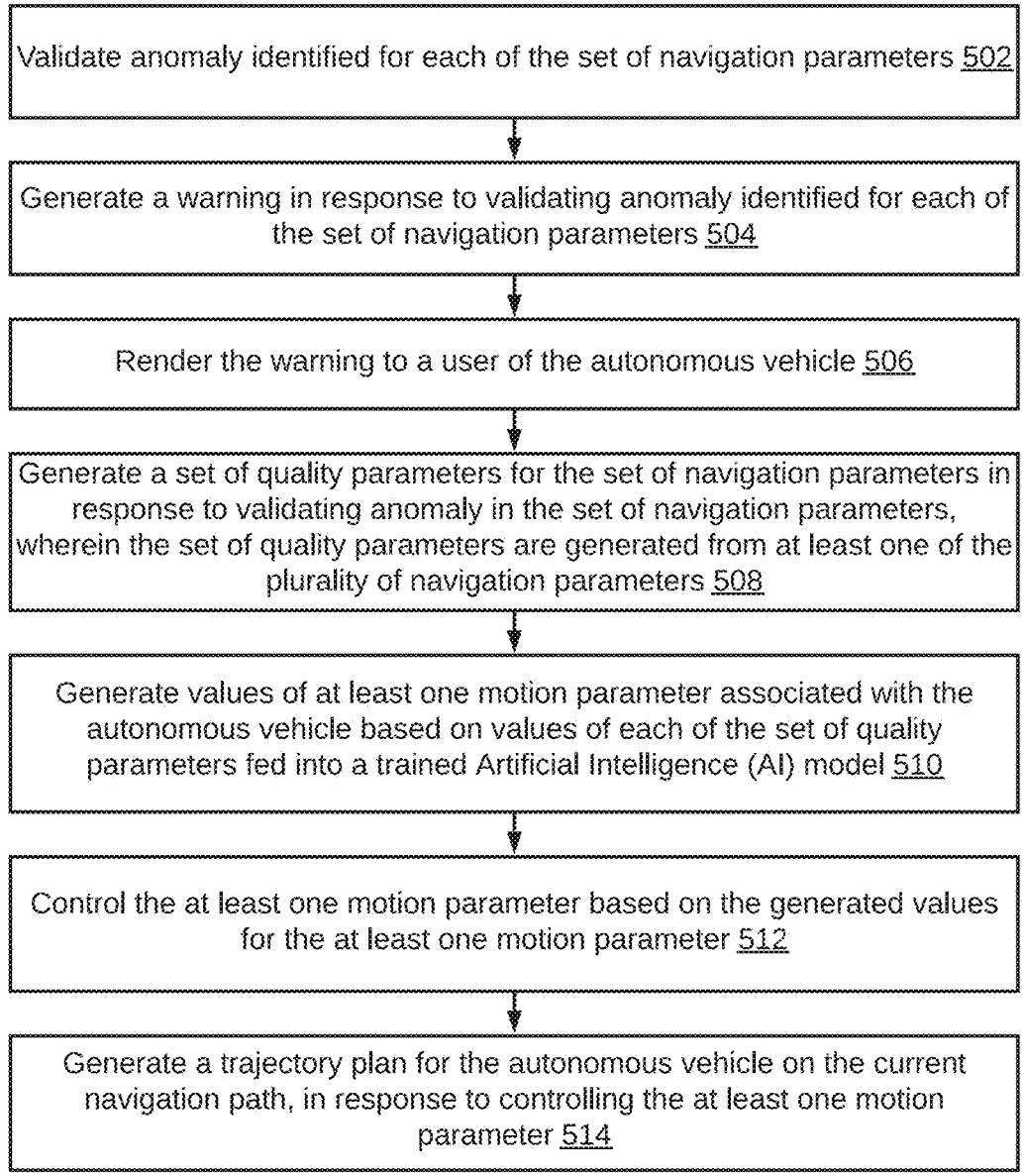
FIG. 5 illustrates a flowchart of a method for generating a warning and a trajectory plan for an autonomous vehicle based on a diagnosis of the autonomous vehicle, in accordance with an embodiment.

Referring now to FIG. 5, a flowchart of a method for generating a warning and a trajectory plan for an autonomous vehicle based on diagnosis of the autonomous vehicle is illustrated, in accordance with an embodiment. At step 502, anomaly identified for each of a set of navigation parameters is validated, by evaluating an associated data. Once the anomaly is validated, a warning is generated, at step 504, in response to validation of anomaly identified for each of the set of navigation parameters. Thereafter, at step 506, the generated warning is rendered to a user of the autonomous vehicle. This has already been explained in detail in conjunction with FIG. 2.

At step 508, in response to validating anomaly in the set of navigation parameters, a set of quality parameters are generated for the set of navigation parameters. The set of quality parameters are generated from one or more of the plurality of navigation parameters. At step 510, based on values of each of the set of quality parameters fed into a trained AI model, the trained AI model generates values of one or more motion parameters associated with the autonomous vehicle. Thereafter, at step 512, the one or more motion parameters are controlled based on the generated values. At step 514, in response to controlling the one or more motion parameters, a trajectory plan is generated for the autonomous vehicle on the current navigation path. This has already been explained in detail in conjunction with FIG. 2.

Figure 6:
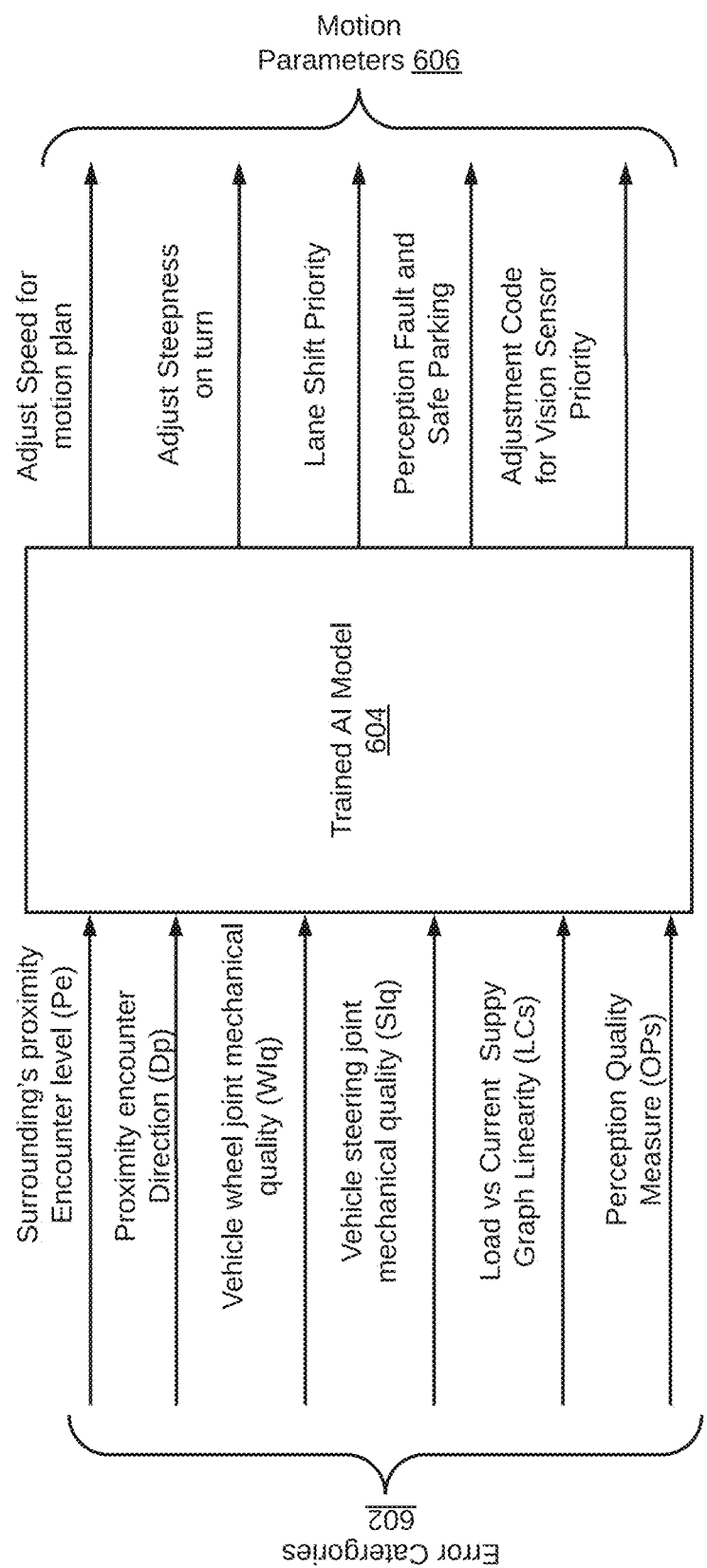
FIG. 6 depicts a trained AI model providing adjustable parameters for various error categories, in accordance with an exemplary embodiment.

Referring now to FIG. 6, a trained AI model 604 providing adjustable parameters for various error categories is depicted, in accordance with an exemplary embodiment. On receiving a plurality of error categories 602, the trained AI model 604 may provide an appropriate output, i.e., values of one or more motion parameters 606 that need to adjusted or controlled. The plurality of error categories 602 and the one or more motion parameters 606 have already been explained in conjunction with FIG. 2. The plurality of error categories 602 may correspond to a set of quality parameters. The plurality of error categories 602 may include, but are not limited to surrounding's proximity encounter level, i.e., Pe, a proximity encounter direction, i.e., Dp, a vehicle wheel joints mechanical quality, i.e., WJq, a vehicle steering joints mechanical quality, i.e., SJq, a load vs current supply graph linearity, i.e., LCs, and a perception quality measure, i.e., Op. Further, the one or more motion parameters 606 may include, but are not limited to adjusting speed for motion plan, adjusting steepness on turn, a lane shift priority, a perception fault and safe parking, and an adjustment code for vision sensor priority.

Thus, the trained AI model 604 is trained with forecast on the plurality of error categories and respective levels. For each of the plurality of error categories with different level values, values of a set of motion parameter may be annotated on output. This output parameter value may be selected, such that, it has an effect on a softer trajectory plan for the autonomous vehicle. For example, maximum velocity (both linear and angular) may be reduced to a certain value for a particular error category value. For the same error category condition, lane shift priority may be reduced to 40% or so. While one or more output values for motion parameters may take the lead on particular error category, output values for other motion parameters may have a lower magnitude of impact to the trajectory plan.

For error category inputs into the AI model 604, although any error category may not be exclusive, it will have some influence on one or more other error categories. By way of an example, an abrupt orientation change may have an impact on abruptness of steering angle. By way of another example, high proximity encounter level may have an impact on abrupt change in velocity of the autonomous vehicle. Considering all such numerous possibilities, a data set is produced taking real-time scenarios captured from data related to autonomous vehicles, in order to train the AI model 604.

Figure 8:
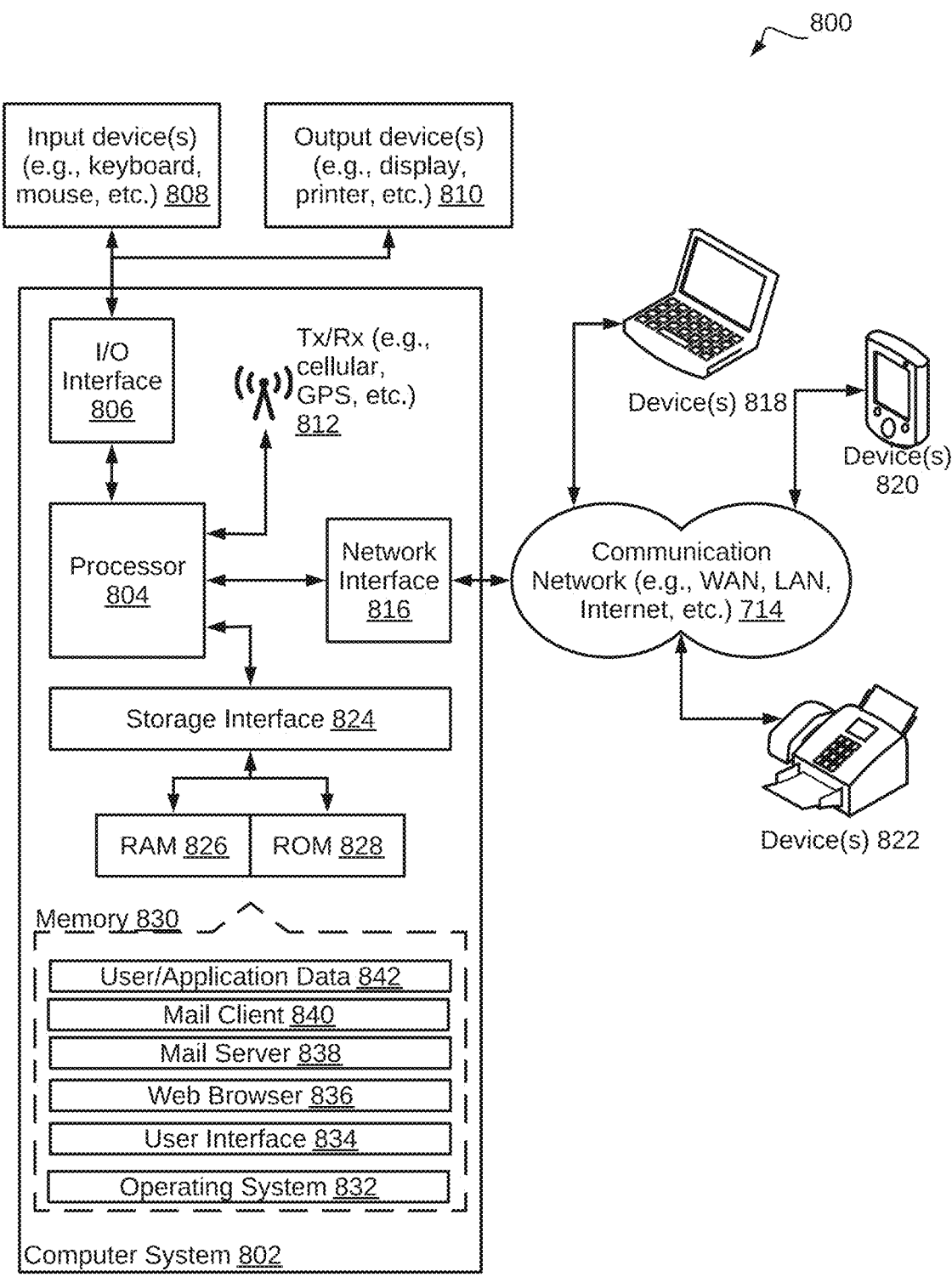
FIG. 8 illustrates a block diagram of an exemplary computer system for implementing embodiments consistent with the present disclosure.

Referring now to FIG. 8, a block diagram of an exemplary computer system 802 for implementing various embodiments is illustrated. Computer system 802 may include a central processing unit ("CPU" or "processor") 804. Processor 804 may include at least one data processor for executing program components for executing user or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures, Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 810 may be a printer, fax machine, video display (for example, cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (for example, using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of these devices.

In some embodiments, processor 804 may be disposed in communication with one or more memory devices (for example, RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or database components, including, without limitation, an operating system 832, user interface application 834, web browser 836, mail server 838, mail client 840, user/application data 842 (for example, any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 802 may implement a mail server 838 stored program component. Mail server 838 may be an Internet mail server such as MICROSOFT® EXCHANGE® mail server, or the like. Mail server 838 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for diagnosing autonomous vehicles on a current navigation path. The method and system monitor behavior of an autonomous vehicle to identify an anomaly in one or more navigation parameters associated with the autonomous vehicle. The method and system then perform cross validation to ensure that the anomaly is related to health of the autonomous vehicle. Thereafter, the method and system determine various compensating motion parameter using an AI model and quality parameters derived from one or more motion parameters in order to avoid any damage to the autonomous vehicle and/or a resultant injury to people inside the autonomous vehicle.

The specification has described method and system for diagnosing autonomous vehicles on a current navigation path. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for diagnosing autonomous vehicles on a current navigation path, the method comprising:
   identifying, by a diagnosis device, an anomaly in a set of navigation parameters from a plurality of navigation parameters associated with the autonomous vehicle, wherein each of the set of navigation parameters is above an associated risk threshold, wherein the set of navigation parameters is indicative of a rate of change in steering speed, acceleration and braking time of the autonomous vehicle, proximity of autonomous vehicle with nearby vehicles, and attributes associated with a tracked path, and wherein the anomaly is indicative of a change in the steering angle or linear acceleration, continuous proximity of a rear vehicle, proximity with objects, and a rate of change of orientation of the autonomous vehicle;
   validating, by the diagnosis device, the anomaly identified for each of the set of navigation parameters;
   generating, by the diagnosis device, a set of quality parameters for the set of navigation parameters in response to validating the anomaly in the set of navigation parameters, wherein the set of quality parameters are generated from at least one of the plurality of navigation parameters, wherein a value of each of the set of quality parameters corresponds to an error category from a plurality of error categories and wherein each of the plurality of error categories comprises corresponding values of the at least one motion parameter;
   training, by the diagnosis device, an Artificial Intelligence (AI) model based on the plurality of error categories and the corresponding values of the at least one motion parameter;
   generating, by the diagnosis device, values of at least one motion parameter associated with the autonomous vehicle based on values of each of the set of quality parameters fed into the trained Artificial Intelligence (AI) model; and
   controlling, by the diagnosis device, the at least one motion parameter based on the generated values for the at least one motion parameter.

2. The method of claim 1, further comprising:
   determining a number of instances when the set of navigation parameters crosses the associated risk threshold;
   comparing, for each of the set of navigation parameters, the number of instances with an associated reoccurrence threshold;
   identifying a subset of navigation parameters from the set of navigation parameters based on the comparing, wherein each of the subset of navigation parameters is above the associated reoccurrence threshold; and
   generating a subset of quality parameters for the subset of navigation parameters, wherein the subset of quality parameters are generated based on at least one of the plurality of navigation parameters.

3. The method of claim 2, wherein the anomaly is identified for the subset of navigation parameters, and wherein values of the at least one motion parameter is generated based on values of the subset of quality parameters fed into the trained AI model.

4. The method of claim 1, further comprising generating a trajectory plan for the autonomous vehicle on the current navigation path, in response to controlling the at least one motion parameter.

5. The method of claim 1, further comprising:
   generating a warning in response to validating the anomaly identified for each of the set of navigation parameters; and
   rendering the warning to a user of the autonomous vehicle.

6. The method of claim 1, further comprising recording the plurality of navigation parameters based on a plurality of sensors within the autonomous vehicle on the current navigation path.

7. A system for diagnosing autonomous vehicles on a current navigation path, the system comprising:
   a processor; and
   a memory communicatively coupled to the processor, wherein the memory stores processor instructions, which, on execution, causes the processor to:
   identify an anomaly in a set of navigation parameters from a plurality of navigation parameters associated with the autonomous vehicle, wherein each of the set of navigation parameters is above an associated risk threshold, wherein the set of navigation parameters is indicative of a rate of change in steering speed, acceleration and braking time of the autonomous vehicle, proximity of autonomous vehicle with nearby vehicles, and attributes associated with a tracked path, and wherein the anomaly is indicative of a change in the steering angle or linear acceleration, continuous proximity of a rear vehicle, proximity with objects, and a rate of change of orientation of the autonomous vehicle;

validate the anomaly identified for each of the set of navigation parameters;

generate a set of quality parameters for the set of navigation parameters in response to validating the anomaly in the set of navigation parameters, wherein the set of quality parameters are generated from at least one of the plurality of navigation parameters, wherein a value of each of the set of quality parameters corresponds to an error category from a plurality of error categories and wherein each of the plurality of error categories comprises corresponding values of the at least one motion parameter;

train an Artificial Intelligence (AI) model based on the plurality of error categories and the corresponding values of the at least one motion parameter;

generate values of at least one motion parameter associated with the autonomous vehicle based on values of each of the set of quality parameters fed into the trained Artificial Intelligence (AI) model; and control the at least one motion parameter based on the generated values for the at least one motion parameter.

8. The system of claim 7, wherein the processor instructions further cause the processor to:

determine a number of instances when the set of navigation parameters crosses the associated risk threshold;

compare, for each of the set of navigation parameters, the number of instances with an associated reoccurrence threshold;

identify a subset of navigation parameters from the set of navigation parameters based on the comparing, wherein each of the subset of navigation parameters is above the associated reoccurrence threshold; and generate a subset of quality parameters for the subset of navigation parameters, wherein the subset of quality parameters are generated based on at least one of the plurality of navigation parameters.

9. The system of claim 8, wherein the anomaly is identified for the subset of navigation parameters, and wherein values of the at least one motion parameter is generated based on values of the subset of quality parameters fed into the trained AI model.

10. The system of claim 7, wherein the processor instructions further cause the processor to generate a trajectory plan for the autonomous vehicle on the current navigation path, in response to controlling the at least one motion parameter.

11. The system of claim 7, wherein the processor instructions further cause the processor to:

generate a warning in response to validating the anomaly identified for each of the set of navigation parameters; and render the warning to a user of the autonomous vehicle.

12. The system of claim 7, wherein the processor instructions further cause the processor to record the plurality of navigation parameters based on a plurality of sensors within the autonomous vehicle on the current navigation path.

13. A non-transitory computer-readable storage medium having stored thereon, a set of computer-executable instructions causing a computer comprising one or more processors to perform steps comprising:

identifying an anomaly in a set of navigation parameters from a plurality of navigation parameters associated with the autonomous vehicle, wherein each of the set of navigation parameters is above an associated risk threshold, wherein the set of navigation parameters is indicative of a rate of change in steering speed, acceleration and braking time of the autonomous vehicle, proximity of autonomous vehicle with nearby vehicles, and attributes associated with a tracked path, and wherein the anomaly is indicative of a change in the steering angle or linear acceleration, continuous proximity of a rear vehicle, proximity with objects, and a rate of change of orientation of the autonomous vehicle;

validating the anomaly identified for each of the set of navigation parameters;

generating a set of quality parameters for the set of navigation parameters in response to validating the anomaly in the set of navigation parameters, wherein the set of quality parameters are generated from at least one of the plurality of navigation parameters, wherein a value of each of the set of quality parameters corresponds to an error category from a plurality of error categories and wherein each of the plurality of error categories comprises corresponding values of the at least one motion parameter;

train an Artificial Intelligence (AI) model based on the plurality of error categories and the corresponding values of the at least one motion parameter;

generating values of at least one motion parameter associated with the autonomous vehicle based on values of each of the set of quality parameters fed into the trained Artificial Intelligence (AI) model; and controlling the at least one motion parameter based on the generated values for the at least one motion parameter.

* * * * *